W. McLAUGHLIN.
RECUPERATOR FOR GLASS FURNACES AND THE LIKE.
APPLICATION FILED APR. 20, 1920.
1,432,706.
Patented Oct. 17, 1922.
2 SHEETS—SHEET 1.
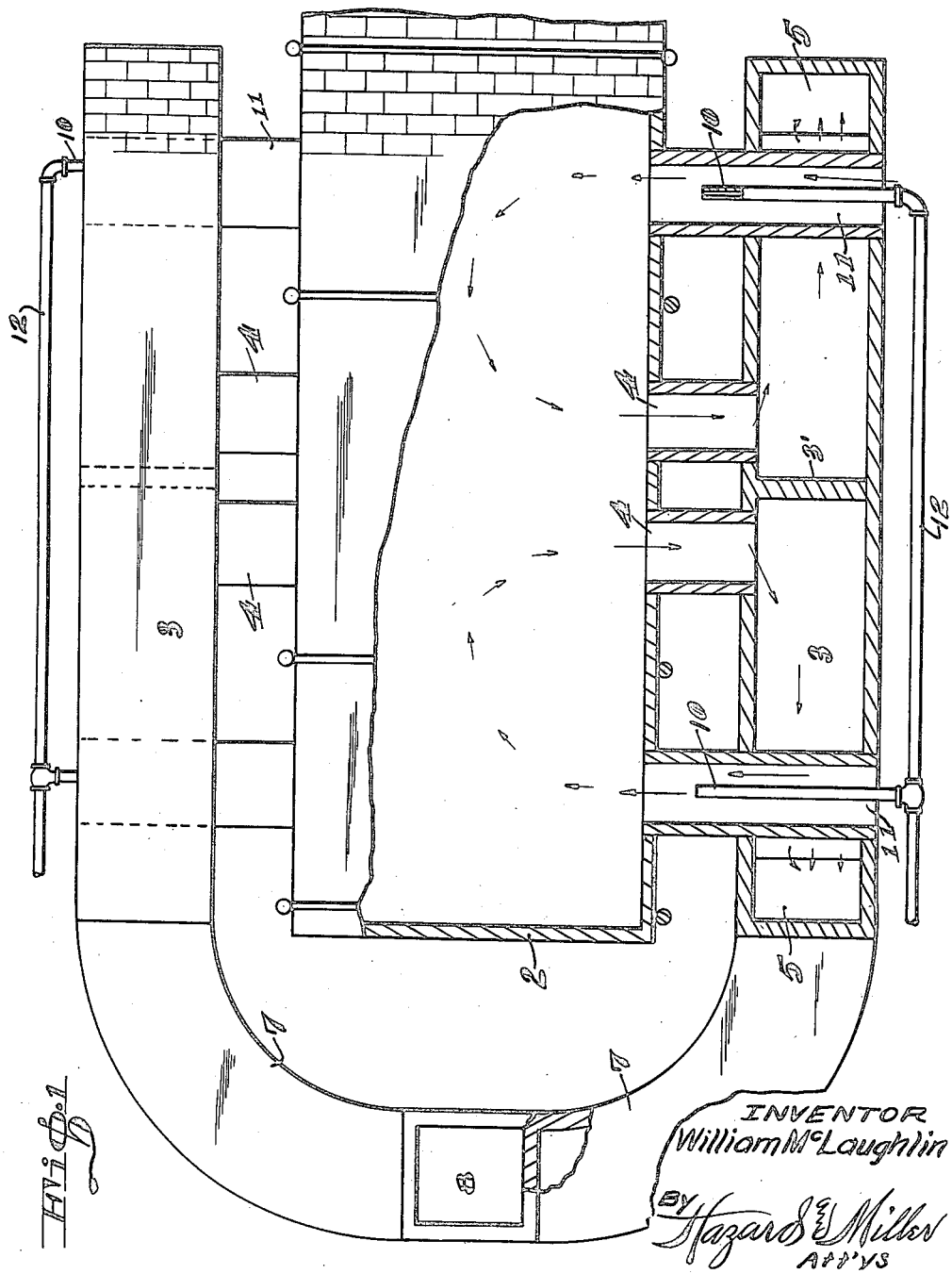

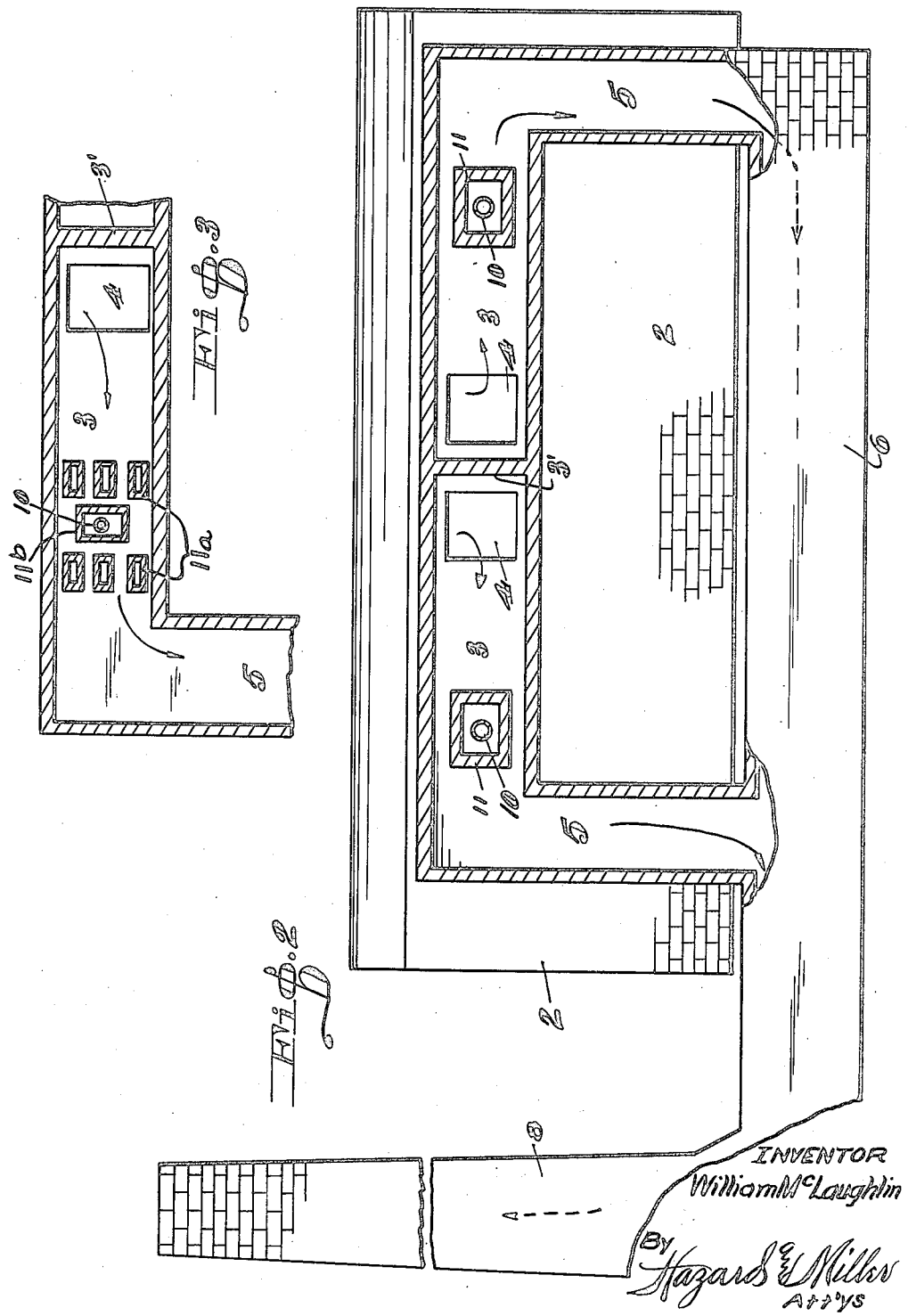

Patented Oct. 17, 1922.

1,432,706

UNITED STATES PATENT OFFICE.

WILLIAM McLAUGHLIN, OF LOS ANGELES, CALIFORNIA, ASSIGNOR OF ONE-HALF TO CHARLES E. NORTON, OF GLENDALE, CALIFORNIA.

RECUPERATOR FOR GLASS FURNACES AND THE LIKE.

Application filed April 20, 1920. Serial No. 375,334.

*To all whom it may concern:*

Be it known that I, WILLIAM MCLAUGHLIN, a citizen of the United States, residing at Los Angeles, in the county of Los Angeles and State of California, have invented new and useful Improvements in Recuperators for Glass Furnaces and the like, of which the following is a specification.

This invention relates to glass furnaces, and particularly to recuperative furnaces, and has for its object to improve the construction of such furnaces, so as to enable the use of the gases coming from the furnace in the heating of air supplied to aid combustion of fuel at the burners of the furnace, and the invention consists of the construction and details, embodiments of which are illustrated in the accompanying drawings and described and claimed hereinafter.

Figure 1 is a plan view of the improved furnace, with parts broken away and in section.

Fig. 2 is a vertical sectional view through one of the flues of the furnace, the latter being partly in elevation.

Fig. 3 is a detail sectional view through a portion of one of the gas flues, showing a modified arrangement of the air tubes.

The melting chamber or tank of the furnace may be of any suitable construction and as indicated at 2 is of oblong form in plan and along its sides extend gas passage-ways or flues 3—3 into which lead outlet passage-ways 4—4 from the melting chamber. These passage-ways extend along the upper part of the furnace or tank structure 2 and have at their ends downwardly turned passage-ways or flues 5, in this case leading into horizontal outlet flues or passage-ways 6 that may be arranged below the floor level of the furnace, and these lower passage-ways 6 converge at one end as at 7 into an uptake chimney 8.

One of the features of the present invention resides in the utilization of the hot gases coming from the furnace to raise the temperature of air supplied to support combustion at burners such as indicated conventionally as at 10 in the form of inwardly extending supply pipes that are arranged in air tubes or flues 11 extending transversely from the sides of the tank or furnace body 2, and the outer ends of which air tubes 11 are shown as passing through the gas flues or passage-ways 3, this gas passing entirely around the interposed air tubes 11 to impart their heat thereto.

The burners 10 are connected to fuel supply pipes as 12 leading from a suitable source of supply of fuel. As shown in Figs. 1 and 2 the gases coming from the transverse passage-ways 4 are deflected in opposite directions by an intermediate panel wall as 3' arranged intermediate the length of the upper passage-way 3, thus insuring the most effective distribution of the hot gases and the utilization of the heat thereof for heating the air passing into the air tubes 11.

A somewhat modified arrangement of the air tubes is indicated in Fig. 3, in which the volume of air is divided into various streams, each passing through independent inlet tubes 11$^a$ spaced from each other and extending tranversely across the gas passage 3, one of the tubes as 11$^b$ enclosing the fuel supply part or burner 10, and this tube 11$^b$ is shown as arranged so as to intercept the flow of gases passing through the space between adjacent tubes 11$^a$.

Various changes may be made without departing from the spirit of my invention as claimed.

I claim:

1. In a glass furnace, a melting tank having gas outlet flues along its walls and terminating in a horizontal flue, a chimney into which the ends of said horizontal flue converge, air inlet passages extending through said horizontal flue and spaced from the walls of said flue and placed at the remote ends thereof, said inlet passages and outlet flues being in the same horizontal plane, and burners adjacent the inner ends of the air passages.

2. In a glass furnace, a melting tank having gas outlet flues along its side walls; a chimney into which the flues converge; air inlet passages extending across the flues and spaced from the walls thereof so as to be surrounded by the heated outgoing gases; said outlet flues and inlet passages made in the same horizontal plane and burners adjacent the inner ends of the air passages.

3. In a glass furnace, a melting tank having gas outlet flues along its walls; a chimney into which the flues converge; air inlet passages extending across the flues and spaced from the walls thereof so as to be surrounded by the heated out-going gases; said outlet flues and inlet passages made in the same horizontal plane and burners adjacent the inner ends of the air passages, the air passages arranged at remote ends of the flue.

4. In a glass furnace, a melting tank having gas outlet flues along its walls; a chimney into which the flues converge; air inlet passages extending across the flues and spaced from the walls thereof so as to be surrounded by the heated out-going gases; and burners adjacent the inner ends of the air passages, said flue having a baffle wall intermediate its length to divide the flue into separate outlets in which certain of said air passages are arranged.

In testimony whereof I have signed my name to this specification.

WILLIAM McLAUGHLIN.